(12) United States Patent
Benner

(10) Patent No.: US 8,537,370 B2
(45) Date of Patent: Sep. 17, 2013

(54) OPTICAL POSITION MEASURING DEVICE

(75) Inventor: Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 396 days.

(21) Appl. No.: 12/995,070

(22) PCT Filed: Mar. 31, 2009

(86) PCT No.: PCT/EP2009/053797
§ 371 (c)(1),
(2), (4) Date: Nov. 29, 2010

(87) PCT Pub. No.: WO2009/144057
PCT Pub. Date: Dec. 3, 2009

(65) Prior Publication Data
US 2011/0109917 A1    May 12, 2011

(30) Foreign Application Priority Data
May 31, 2008  (DE) .................. 10 2008 025 870

(51) Int. Cl.
*G01B 11/14*    (2006.01)
(52) U.S. Cl.
USPC ........... 356/614; 356/615; 356/616; 356/617; 356/621
(58) Field of Classification Search
USPC ..... 356/237.1–241.6, 242.1–243.8, 426–431, 356/600–640
See application file for complete search history.

(56) References Cited

U.S. PATENT DOCUMENTS

| | | | | |
|---|---|---|---|---|
| 3,153,111 | A | * | 10/1964 | Leslie et al. ............ 356/618 |
| 4,914,309 | A | * | 4/1990 | Masaharu et al. ....... 250/559.48 |
| 5,064,290 | A | * | 11/1991 | McMurtry et al. ............ 356/499 |
| 5,450,199 | A | | 9/1995 | Rieder |
| 5,648,658 | A | | 7/1997 | Holzapfel et al. |
| 6,526,190 | B2 | * | 2/2003 | Holzapfel et al. ............... 385/12 |
| 6,528,779 | B1 | * | 3/2003 | Franz et al. ................ 250/214.1 |
| 6,907,372 | B1 | * | 6/2005 | Spanner ....................... 702/104 |
| 7,473,886 | B2 | | 1/2009 | Benner |
| 7,705,289 | B2 | | 4/2010 | Benner |

(Continued)

FOREIGN PATENT DOCUMENTS

| | | |
|---|---|---|
| DE | 10 2006 021 017 A1 | 11/2007 |
| DE | 10 2007 028 943 A1 | 12/2008 |
| EP | 0 608 209 A2 | 7/1994 |
| EP | 1 852 684 A1 | 11/2007 |

*Primary Examiner* — Gregory J Toatley
*Assistant Examiner* — Jarreas C Underwood
(74) *Attorney, Agent, or Firm* — Brinks, Hofer, Gilson & Lione

(57) ABSTRACT

A measuring device for detecting a relative position, the measuring device including a measurement graduation movable in at least one measurement direction and a scanning unit for determining a relative position of the measurement graduation with respect to the scanning unit. The scanning unit includes a light source, a scanning grating disposed on a first side of a transparent carrier element that is positioned in a scanning beam path and a detector arrangement. The scanning unit further includes an attenuation structure that adjusts a light intensity on the detector arrangement in a defined manner, wherein either 1) the attenuation structure is disposed on a second side, opposite the first side, of the transparent carrier element or 2) the attenuation structure has a permeability that varies as a function of location at least along one direction so that a light intensity which is uniform at least in that one direction results on the detector arrangement.

24 Claims, 11 Drawing Sheets

(56) References Cited

U.S. PATENT DOCUMENTS

| | | | |
|---|---|---|---|
| 7,710,578 B2 * | 5/2010 | Sandig et al. | 356/499 |
| 7,872,762 B2 * | 1/2011 | Hermann et al. | 356/499 |
| 2007/0262250 A1 | 11/2007 | Benner | |
| 2008/0315077 A1 | 12/2008 | Benner | |

* cited by examiner

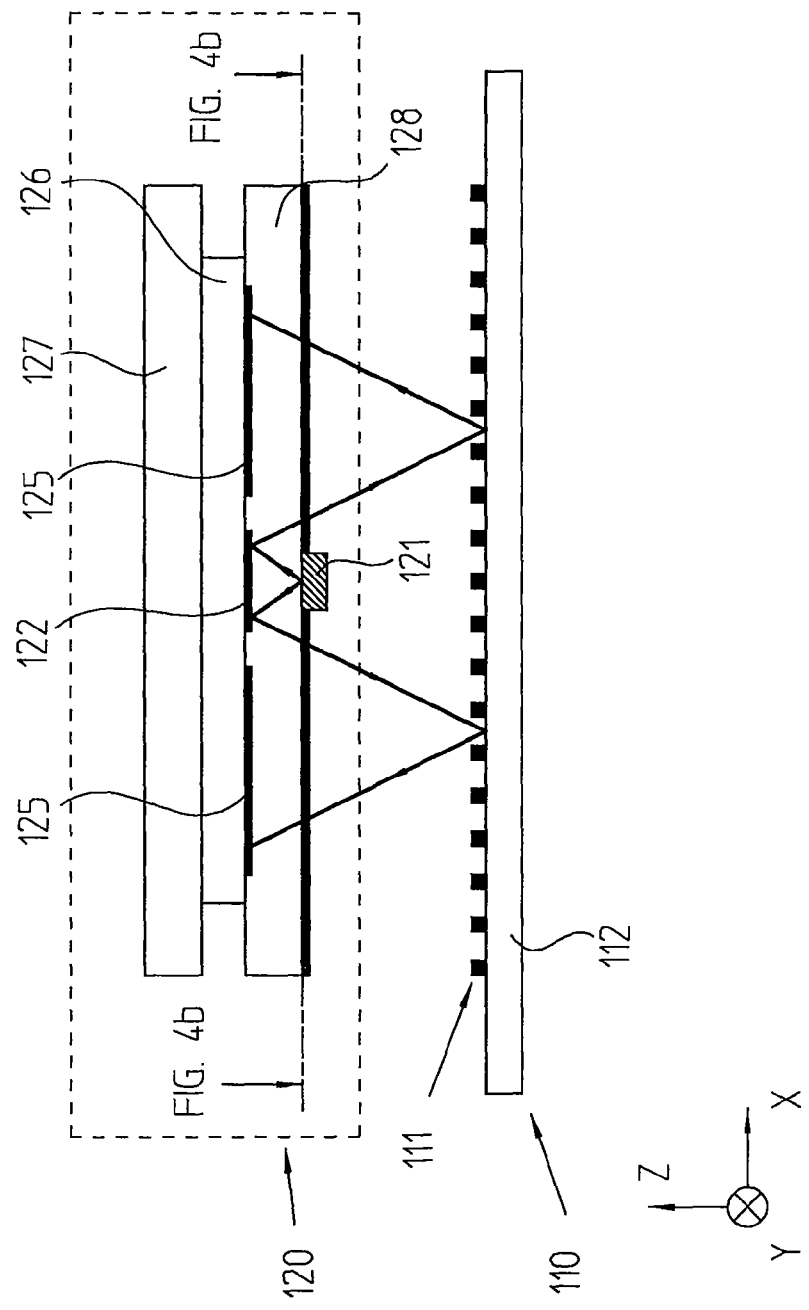

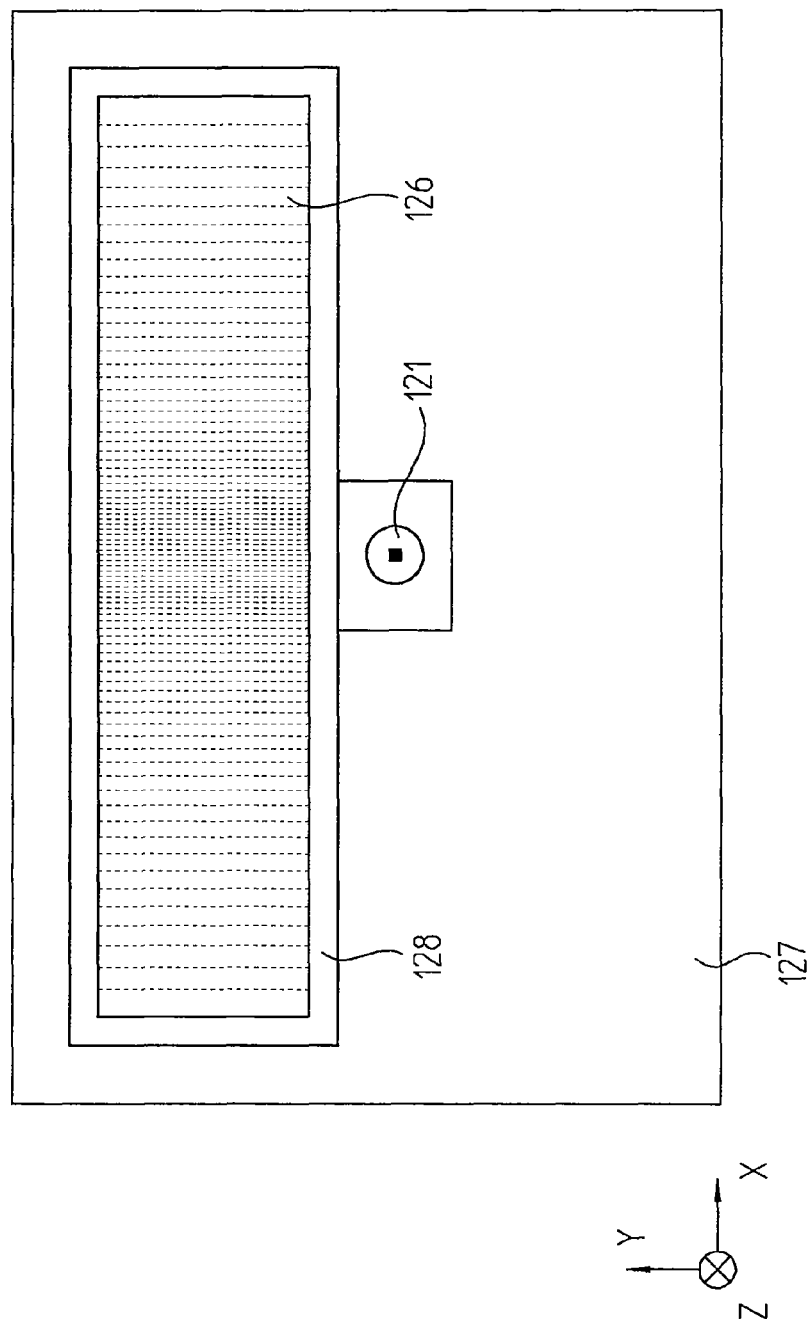

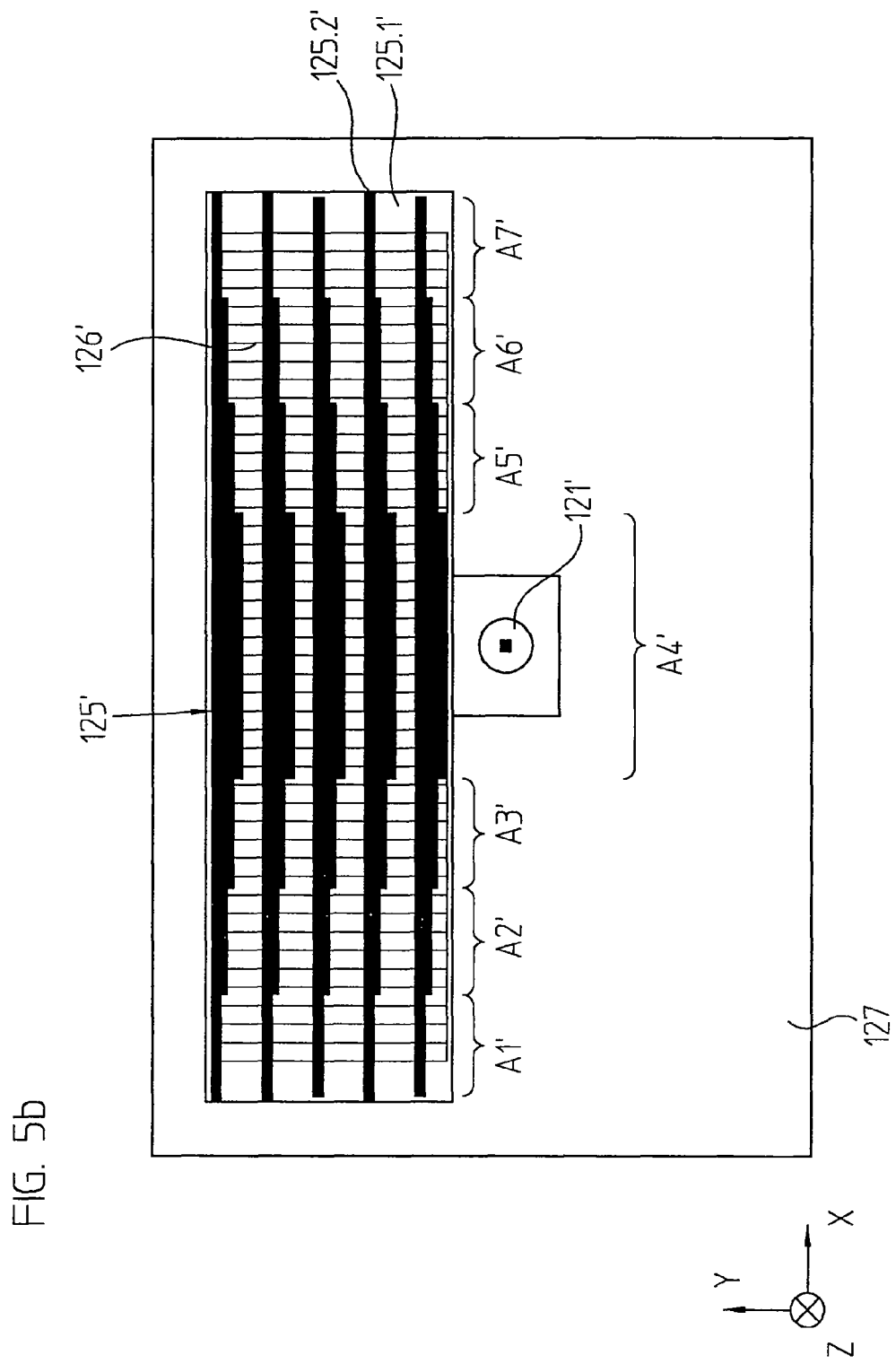

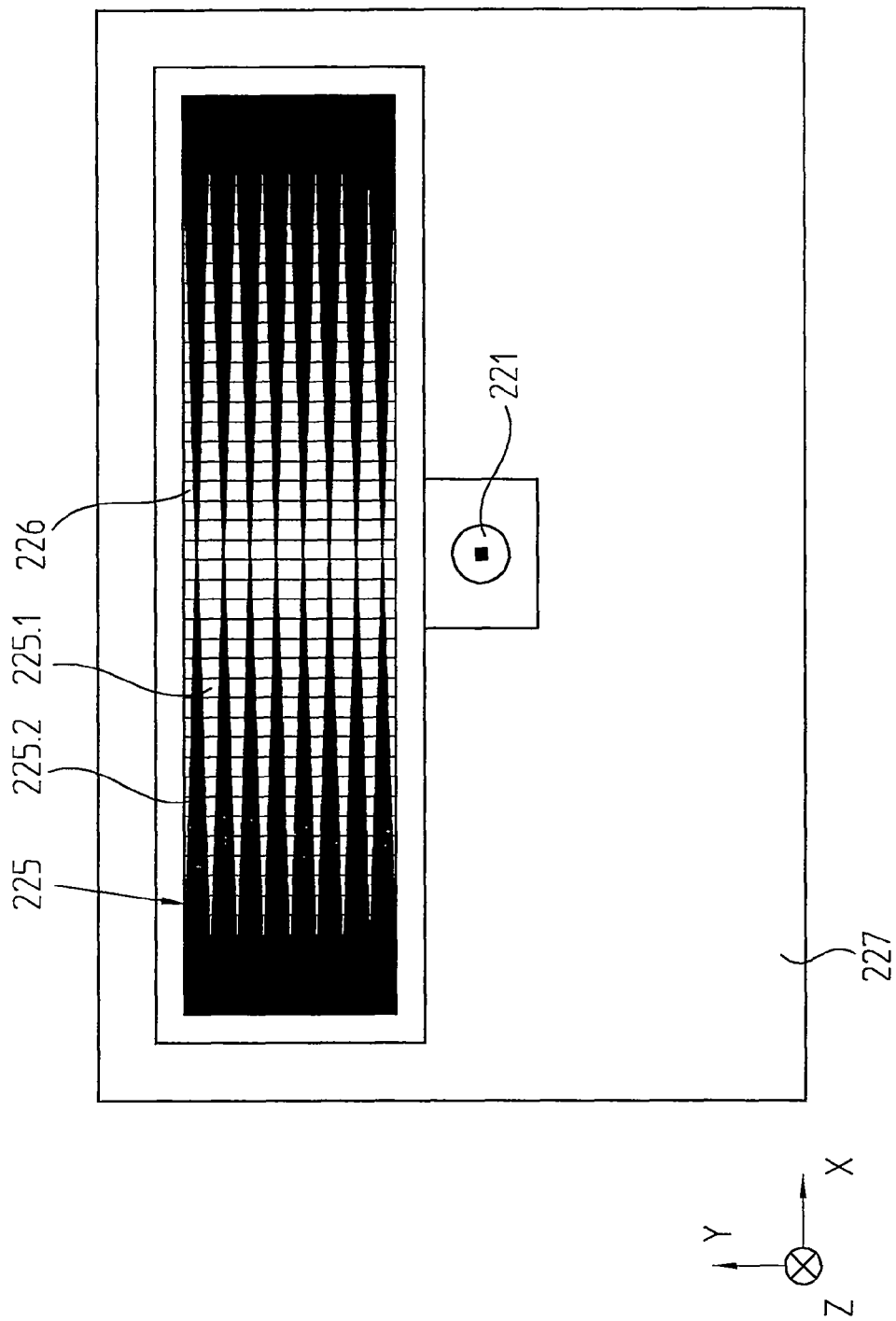

OPTICAL POSITION MEASURING DEVICE

Applicant claims, under 35 U.S.C. §§120 and 365, the benefit of priority of the filing date of Mar. 31, 2009 of a Patent Cooperation Treaty patent application, copy attached, Serial Number PCT/EP2009/053797, filed on the aforementioned date, the entire contents of which are incorporated herein by reference, wherein Patent Cooperation Treaty patent application Serial Number PCT/EP2009/053797 was not published under PCT Article 21(2) in English.

Applicants claim, under 35 U.S.C. §119, the benefit of priority of the filing date of May 31, 2008 of a German patent application, copy attached, Serial Number 10 2008 025 870.9, filed on the aforementioned date, the entire contents of which is incorporated herein by reference.

BACKGROUND OF THE INVENTION

1. Field of the Invention

The present invention relates to an optical measuring device and to an optical measuring device.

2. Description of the Related Art

An optical measuring device of this generic type is known for instance from European Patent Disclosure EP 0 608 209 A2. It includes a measurement graduation, embodied for instance as a linear measurement graduation, and a scanning unit that is displaceable in at least one measurement direction relative to the measurement graduation. In the scanning unit, a light source, at least one scanning grating and a detector arrangement, having a plurality of photoelements, are provided. In the scanning unit, an attenuation structure is disposed. The attenuation structure includes a grating oriented perpendicular to other gratings in the scanning beam path. With the aid of the additional grating, the light intensity that strikes the detector arrangement can be adjusted in a defined manner. Such adjustment of the light intensity striking the detector arrangement may for instance be necessary if standardized opto-ASICs are supposed to be used in the scanning units of different optical measuring devices. In that case, it can happen that the opto-ASIC, optimized for a first category of optical measuring devices, proves not to be optimal for other categories of optical measuring devices. Thus, it is conceivable that the intensity striking the detector arrangement of opto-ASICs is variously high in the various measuring devices. By use of the previously mentioned attenuation structure, embodied as an additional grating- as proposed in EP 0 608 209 A2—the high signal intensity in the detector arrangement can then be attenuated. Because of the different orientation of the additional grating, the actual scanning beam path for generating the displacement-dependent scanning signals remains largely unaffected. However, EP 0 608 209 A2 does not teach how and where this kind of attenuation structure is most suitably disposed in the scanning beam path or in the scanning unit and how the attenuation structure is most advantageously embodied.

SUMMARY AND OBJECTS OF THE INVENTION

It is an object of the present invention to create a measuring device of the type mentioned above which makes flexible adjustment of the light intensity striking the detector arrangement possible.

This object is attained according to the present invention by a measuring device for detecting a relative position, the measuring device including a measurement graduation and a scanning unit, being movable in at least one measurement direction with respect to the measurement graduation. The scanning unit includes a light source, a scanning grating disposed on a first side of a transparent carrier element that is positioned in a scanning beam path and a detector arrangement. The scanning unit further includes an attenuation structure that adjusts a light intensity on the detector arrangement in a defined manner, wherein the attenuation structure is disposed on a second side, opposite the first side, of the transparent carrier element.

This object is furthermore attained according to the present invention by a measuring device for detecting a relative position, the measuring device including a measurement graduation and a scanning unit, being movable in at least one measurement direction with respect to the measurement graduation. The scanning unit includes a light source, a scanning grating disposed on a first side of a transparent carrier element that is positioned in a scanning beam path and a detector arrangement. The scanning unit further includes an attenuation structure that adjusts a light intensity on the detector arrangement in a defined manner, wherein the attenuation structure has a permeability that varies as a function of location at least along one direction so that a light intensity which is uniform at least in that one direction results on the detector arrangement.

In a first variant of the measuring device of the present invention, it is now provided that the scanning grating and the attenuation structure are disposed on the front and back sides of a transparent carrier element in the scanning beam path.

By way of the provision according to the present invention, it is possible in particular to reduce the number of components required in the optical measuring device.

In a second variant of the measuring device, it is provided according to the present invention that the attenuation structure has a permeability that varies as a function of location, so that a light intensity which is uniform at least in that direction results on the detector arrangement.

In a second embodiment of a measuring device of the present invention, it can be ensured that in the case for instance of a locally varying intensity over the detector arrangement resulting without an attenuation structure, an extensively homogeneous distribution of intensity can be ensured. This kind of varying intensity distribution can result for instance in conjunction with special light sources, which have a defined emission characteristic. In this way, the detection reliability is markedly increased with regard to the image resulting in the detection plane, since a homogeneous light distribution beyond the detector arrangement preferably in the measurement direction is present, a homogeneous light distribution is attained. The processing of the resultant light pattern in the detection plane is then not so vulnerable to malfunction.

Manifold embodiment possibilities exist with regard to the two variants of measuring devices of the present invention.

Thus the attenuation structure can be embodied as an arrangement of transparent subregions on an opaque layer.

The transparent subregions can be embodied in circular form.

It is furthermore possible that the attenuation structure is embodied as a grating, in which transparent subregions are disposed periodically on the opaque layer.

The transparent subregions of the grating can be embodied in linear form and can be oriented perpendicular to the measurement graduation in the scanning beam path.

The grating of the attenuation structure can have one or more periodicities, which are each markedly less than the extension of the detector arrangement in a direction perpendicular to the measurement direction.

It is furthermore possible that the attenuation structure is embodied as a grating, in which the transparent subregions are disposed radially symmetrically on the opaque carrier element.

It can be provided that the width of the transparent subregions in the radial direction varies.

Alternatively, it is also possible that the attenuation structure comprises concentrically arranged portions, inside which the transparent subregions of the grating are disposed radially symmetrically and periodically, and the periodicities of adjacent portions differ.

Furthermore, the attenuation structure can also include a plurality of portions disposed adjacent one another in the measurement direction, which portions each include a grating, disposed periodically in a direction perpendicular to the measurement direction, with linear transparent subregions, which are disposed periodically on the opaque layer on a carrier element, and adjacent portions in the measurement direction have a different periodicity.

In one possible variant of the measuring device of the present invention, the elements in the scanning unit are disposed in such a way that
 the beams emitted by the light source initially experience a collimation via a collimator lens;
 the collimated beams thereupon strike the measurement graduation;
 the beams then travel through the scanning grating, the carrier element, and the attenuation structure;
 and finally act on the detector arrangement, at which signals modulated as a function of displacement are then present for further processing.

In a further variant of the measuring device of the present invention, the elements in the scanning grating are disposed in such a way that
 the beams emitted by the light source propagate in the direction of the measurement graduation, thereupon act on the measurement graduation, then travel through the attenuation structure, and because of the interaction with the measurement graduation, a displacement-dependently modulated fringe pattern on the detector arrangement results, and the detector arrangement includes a periodic arrangement of a plurality of detector elements.

The attenuation structure can be disposed on one side of a transparent carrier element in the scanning beam path.

It is possible that the attenuation structure is embodied as a regular arrangement of transparent subregions on an opaque carrier element.

Furthermore, it can be provided that the attenuation structure, at least in the measurement direction, has a permeability that varies as a function of location.

Further details and advantages of the present invention will be explained in the ensuing description of exemplary embodiments of measuring devices of the present invention, in conjunction with the drawings.

These show

BRIEF DESCRIPTION OF THE DRAWINGS

FIG. 3 schematically shows a scanning beam path of a second embodiment of a measuring device in accordance with the present invention;

FIG. 4a shows a light pattern, in a detection plane of the measuring device of FIG. 3 without the use of an attenuation structure;

FIG. 5a shows a light pattern, in the detection plane of the measuring device of FIG. 3, without the use of an attenuation structure, wherein the light source used to generate the light pattern is different than the light source used to generate the light pattern of FIG. 4a;

FIG. 5b shows a view of a further embodiment of an attenuation structure to be used with the measuring device of FIG. 3;

FIG. 6 shows a view of a further embodiment of an attenuation structure to be used with the measuring device of FIG. 3;

DESCRIPTION OF THE PREFERRED EMBODIMENT(S) OF THE INVENTION

Figure 1:
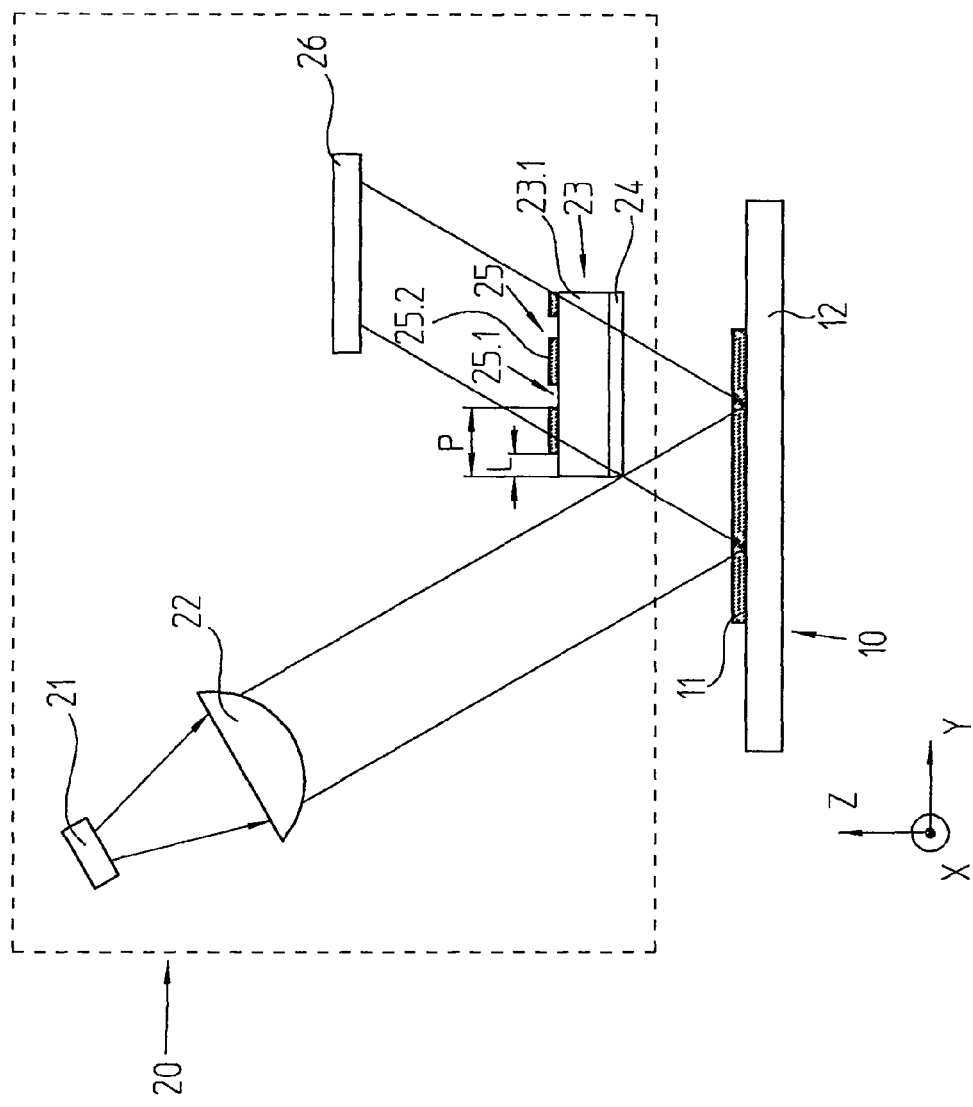
FIG. 1 schematically shows a scanning beam path of a first embodiment of a measuring device in accordance with the present invention.

In the present example shown in FIG. 1, the measuring device of the present invention includes a scanning unit 20 that is disposed movably at least in the measurement direction x relative to a scale 10 having a measurement graduation 11. The measurement direction x, as indicated in the drawing, is oriented perpendicular to the plane of the drawing. The scale 10 and the scanning unit 20 are connected for instance to two objects, disposed displaceably to one another in the measurement direction x, such as two machine parts movable relative to one another. By way of the displacement-dependent position signals of the measuring device of the invention, a downstream control unit-not shown-can suitably control the motion of these machine parts in a known manner.

In the example shown, the measurement graduation 11 is embodied as a reflection measurement graduation, extending linearly in the measurement direction x, on a carrier body 12, which includes periodically disposed graduation regions with different reflection properties. The line-like graduation regions extend in the indicated y direction, that is, in the measurement graduation plane perpendicular to the measurement direction x. The measurement graduation 11, depending on the scanning principle, can be embodied in a known manner as an amplitude grating or as a phase grating.

In the scanning unit 20, for generating the displacement-dependent position signals, a light source 21, collimator optics 22, a scanning plate 23, and a detector arrangement 26 are disposed in a suitable housing. In this example, an LED is provided as the light source 21. The scanning plate 23, in the example shown, includes a transparent carrier element 23.1, embodied for instance as a glass plate. A scanning grating 24 is disposed on the front side or underside facing toward the measurement graduation 11 of the carrier element 23.1. On the back side or top, opposite from it, of the carrier element 23.1, facing toward the detector arrangement 26, an attenuation structure 25 is disposed according to the present invention, whose function and specific embodiment will be described in further detail hereinafter.

The scanning grating 24 includes a periodic arrangement of graduation regions with different optical permeabilities. The graduation regions of the scanning grating 24 are likewise embodied as lines and extend in the indicated y direction, that is, perpendicular to the measurement direction x. Accordingly, the scanning grating 24 is oriented in the scanning beam path in precisely the same way as the measurement graduation 11. Depending on the scanning principle employed for generating the displacement-dependent position signals, the scanning grating 24 can be embodied as an amplitude grating or as a phase grating.

The beams emitted by the light source 21 and collimated by the collimator optics 22 interact in a known manner with the measurement graduation 11 and the scanning grating 24 so that by way of the detector elements of the detector arrangement 26 position signals can be generated that are modulated as a function of displacement. As a result of the suitable embodiment or arrangement of the scanning grating 24 in the form of scanning grating regions slightly offset from one another, with which regions, toward the detector, specific detector elements of the detector arrangement 26 are associated. It is possible to generate phase-offset position signals; typically, it is provided here that four position signals each offset by 90° be generated, signals that can be further processed in a known manner.

The opto-ASIC used in the detector arrangement 26, contains among other things the detector elements as well as further components for signal processing, can be employed in the most various measuring devices that use different optical scanning principles. As a consequence, in some scanning principles the light intensity striking the detector arrangement can be too high. For that reason, in the present exemplary embodiment of a measuring device of the present invention an attenuation structure 25 is disposed on the scanning plate 23 so as to adjust by way of which the light intensity on the detector arrangement 26 in a defined manner. Accordingly, the attenuation structure 25 reduces the overly high intensity on the detector arrangement 26 that would otherwise result with the present scanning principle and the light source 21 used here.

According to the present invention, in this embodiment the attenuation structure 25 is disposed on a free surface of an optical component in the scanning beam path, namely on the otherwise unused back side of the carrier element 23.1 of the scanning plate 23, wherein the backside of the carrier element 32.1 is oriented toward the detector arrangement. Accordingly, for the attenuation structure 25, it is unnecessary to provide a further component which might have to be mounted and adjusted in a complicated way in the course of production of the measuring device. In the example shown, the attenuation structure 25 includes a grating in the form of an amplitude grating, which includes linearly embodied transparent subregions 25.1, which are embodied periodically in an opaque layer; the opaque layer for instance comprises so-called black chrome. Besides the embodiment of the transparent subregions 25.2 in the form of completely absorbent layers, these subregions 25.2 can also be embodied as known stacks of interference layers, in which after multiple reflections, light is no longer let through. In all cases, the result is a grating comprising linear transparent subregions 25.1 and linear opaque subregions 25.2. As can be seen from FIG. 1, the linear subregions 25.1, 25.2 of the attenuation structure 25 extend in the measurement direction x, and the periodic arrangement of them is provided in the y direction. The periodicity of the attenuation structure embodied as a grating is indicated in FIG. 1 by the variable P and extends over the width of adjacent transparent and opaque subregions 25.1, 25.2 in the disposition direction y. In the exemplary embodiment shown, the periodicity P=175 µm and the transmission τ=L/P=0.33 were chosen in order to ensure the desired reduction of intensity on the detector arrangement 26, wherein L indicates the width of the transparent subregions 25.1. The intensity reduction sought is established here fundamentally via the ratio of absorbent surface area of the respective attenuation structure 25 to the total surface area of the back side of the carrier element 23.1 of the scanning plate 23, or in other words by way of the ratio of the surface area occupied by the opaque subregions 25.2 to the total surface area.

If the attenuation structure 25 of the present invention is embodied as a grating, as in the present case, and is oriented perpendicular to the other gratings, then both in this example and in the following examples, it furthermore proves advantageous if the periodicity P of the respective grating is selected as markedly less than the extension of the detector arrangement or the length of individual detector elements in the y-direction perpendicular to the measurement direction. The periodicity P of the grating is selected here, in one possible embodiment, as less by approximately a factor of 10 than the length of a detector element in the y direction. The reason for this is that then the greatest possible homogeneity of the lighting intensity in this direction can be attained. If a grating is arranged with the same orientation as the other gratings in the scanning beam path, the length of the detector elements in the measurement direction would have to be taken into account, and so forth.

It is furthermore favorable if the opaque subregions 25.2 of the attenuation structure 25 are optimized with respect to the substrate-air transition, if as provided in FIG. 1, the scanning beams first pass through the scanning grating 24 and only then strike the attenuation structure 25 or the corresponding grating. This is especially true if the beams in the scanning beam path do not penetrate the carrier element 23.1 at a right angle, but instead extend obliquely, as shown in FIG. 1. In that case, back reflections from opaque subregions 25.2 could possibly occur, which after multiple reflections might have an adverse effect on the scanning beam path and could cause a reduction in the degree of modulation of the position signals. Within the scope of this kind of optimization, the layer thickness of the opaque subregions 25.2, for instance, is adjusted taking wavelength and angle of incidence into account in such a way that back reflections are minimized.

The linear transparent subregions 25.1 of the grating in this variant of the measuring device of the present invention are disposed perpendicular to the measurement graduation 11. In the present example, the subregions are perpendicular to the scanning grating 24 in the scanning beam path, or in other words perpendicular to further graduations or gratings in the scanning beam path. As a consequence of this arrangement of the attenuation structure 25 embodied as a grating, the actual optical scanning beam path for generating displacement-dependent position signals is affected as slightly as possible.

Figure 2A:
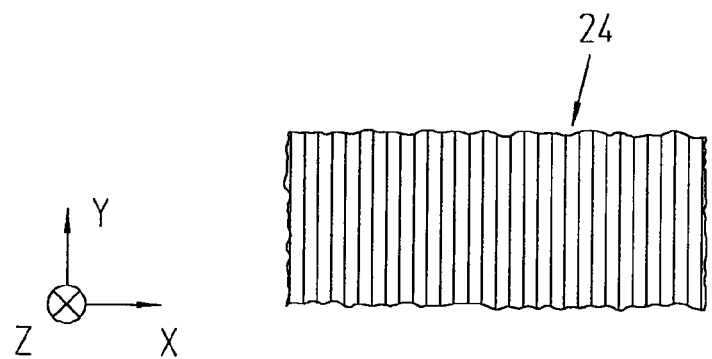
FIGS. 2a and 2b show the front and back sides of a carrier element of the example in FIG. 1.
Figure 2B:
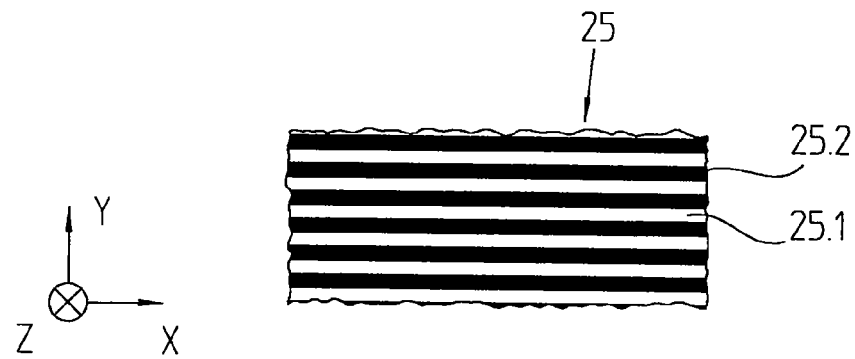

In FIG. 2a, a fragmentary view of the front side of the scanning plate 23 on which the scanning structure 24 is disposed is shown. FIG. 2b shows a detail of the back side of the scanning plate 23 with the attenuation structure 25 in the form of a grating and with transparent subregions 25.1 and opaque subregions 25.2 disposed on it.

In principle, the requisite attenuation action is adjusted by the respective attenuation structure 25 by way of the ratio of the total surface area of the transparent subregions 25.1 to the total surface area of the attenuation structure 25. In other words, in the final analysis, the requisite attenuation action is adjusted by way of the suitable choice of the transmission τ of the attenuation structure 25. If reducing the signal intensity on the detector arrangement to 80% is necessary, the corresponding ratio must then be adjusted to 80%, and so forth.

In the first variant described of a measuring device of the present invention, the attenuation structure 25, as explained, includes linear transparent subregions 25.1 on an otherwise opaque layer. However, it is understood that alternatively to this, it is also possible to provide different geometries for the transparent subregions in the opaque layer. For instance, the attenuation structure could also include many circular transparent subregions on an opaque layer that are distributed suitably. The distribution of the transparent subregions can be either regular or irregular. Moreover, as an alternative to circular subregions, other possible geometries for the permeable subregions are feasible within the scope of the present invention.

A second embodiment of a measuring device of the present invention is shown in FIG. 3. In this embodiment, the scanning beam path differs from that in the first embodiment shown in FIG. 1.

Once again, the measuring device of the present invention of FIG. 3 includes a scanning unit 120 which is disposed movably at least in the measurement direction x relative to a scale 110 with a measurement graduation 111. The measurement graduation 111 disposed on a carrier body 112, such as a steel substrate, is embodied as a reflection measurement graduation, as in the embodiment of FIG. 1.

Once again, only those elements necessary for explanation of the present invention are shown in the highly schematic view in FIG. 3.

A detector arrangement 126 is placed on a carrier circuit board 127 in the scanning unit 120. The detector arrangement 126 serves to scan a fringe pattern in the detection plane and to generate position signals. The fringe pattern in the detection plane results from the optical scanning of the measurement graduation 111 on the scale 110, or, in other words from the interaction of the beams emitted by the light source 121 with the measurement graduation 111. In a distinction from the first embodiment described above, in the present scanning principle of FIG. 3 no separate scanning grating is provided in the scanning beam path. Instead, the detector arrangement 126 now includes a detector array with a periodic arrangement in the measurement direction x of individual detector elements or photodiodes. Thus, in this embodiment, the detector arrangement simultaneously takes on the functionality of both the scanning grating and the detector elements.

Above the detector arrangement 126 in the scanning unit 120, a transparent carrier substrate 128, embodied for instance as a platelike glass carrier substrate, is disposed in a central region. The light source 121 is placed on the side of the carrier substrate 128 toward the measurement graduation 111. In the selected scanning principle, a point light source, such as a so-called VCSEL (vertical cavity surface emitting laser) light source preferably functions as the light source 121.

The radiation-emitting surface of the light source 121 is oriented in this variant in the direction of the side of the carrier substrate 128 facing away from the measurement graduation 111. Accordingly, the light source 121 projects away from the measurement graduation 111.

An optical reflector element 122, which is embodied for instance as a grating structure integrated with the carrier substrate 128. In other words, the optical reflector element 122 a diffractive optical element that is disposed on the side of the carrier substrate 128 facing away from the measurement graduation 111. The optical functionality of this reflector element in the scanning beam path will be described in further detail hereinafter.

The beams emitted by the light source 121 are deflected or reflected back—as can be seen from FIG. 3—by the reflector element 122 in the direction of the measurement graduation 111 and then pass through the carrier substrate 128 once again in the opposite direction. Then, the beams reach the measurement graduation 111, where they are in turn reflected back in the direction of the scanning unit 120. In the scanning unit 120, the partial beams arriving from the measurement graduation 111 finally reach the detector arrangement 126 placed in the detection plane where, in the case of the relative motion of the scanning unit 120 and the scale 110 or measurement graduation 111, they generate displacement-dependent position signals. By way of the scanning beam path described and the resultant interactions of the partial beams with the measurement graduation 111, a periodic fringe pattern is generated in the detection plane. In the case of the relative motion of the scanning unit 120 in the scale 110, this fringe pattern is modulated as a function of displacement and converted in a known manner via the detector arrangement 126 into a plurality of phase-displaced incremental signals for further processing.

For the scanning principle used in this embodiment, it is definitive that the light source 121 employed be disposed as much as possible in the detection plane. Only in that case can the insensitivity of the periodic fringe pattern generated in the detection plane from the applicable scanning spacing be ensured. By skilled design of the scanning beam path and in particular by providing the aforementioned reflector element, an advantageous way of meeting this requirement is provided. Thus by integrating the reflector element 122 with the scanning beam path, it can be attained that the light source 121 is placed virtually in the detection plane, while in reality it is disposed at some other point of the scanning unit 120, namely, on the side of the carrier substrate 128 oriented toward the measurement graduation 111 as shown in FIG. 3. For further details of the scanning beam path of this variant, see for instance German Patent Disclosures DE 10 2006 021 017 A1 and DE 10 2007 028 943 A1 of the present Applicant and corresponding to U.S. Pat. Nos. 7,473,866 and 7,705,289, the entire contents of each of which is incorporated herein by reference.

The attenuation structure 125 required for adaptation or adjustment of the intensity on the detector arrangement 126 is disposed in this embodiment in the scanning beam path on the side of the carrier substrate 128 that is oriented away from the measurement graduation and toward the detector arrangement 126. As seen in FIG. 3, the attenuation structure 125 here is located directly in front of the detector arrangement 126. This is advantageous in that the action of the attenuation structure 125 pertains directly to the light distribution on the detector.

In this embodiment of the measuring device of the present invention, a special embodiment of the attenuation structure 125 is now primarily definitive. While in the first embodiment of FIG. 1 described above a uniform reduction of intensity in location-dependent fashion was ensured over the entire surface area of the downstream detector arrangement, the embodiment of FIG. 3 provides an attenuation structure 125 which at least in one direction ensures a variation or reduction in intensity varying as a function of location with respect to the radiation intensity let through. For that purpose, the attenuation structure 125 is embodied in such a way that in at least one direction, it has a permeability that varies as a function of location. Preferably, at least in the measurement direction x, a varying permeability of the attenuation structure 125 is provided.

This kind of embodiment of the attenuation structure 125 is advantageous in this embodiment of a measuring device of the present invention, especially because of the light source 121 used. As mentioned above, it is embodied as a VCSEL light source, and because of its emission characteristics, it does not provide sufficiently homogeneous lighting intensity over the radiation-sensitive surface of the detector arrangement 126. Instead, without the provisions of the present invention, the result is an intensity increasing outward the light pattern on the detector arrangement 126. A plan view on the resultant light pattern or its intensity distribution in the detection plane of the detector arrangement 126 of FIG. 3 is shown in FIG. 4a in highly schematic form without the attenuation structure of the invention. Especially in the measurement direction x, a marked increase in the intensity of the light pattern can be seen from a central region outward to both sides. This variation in intensity has an adverse effect on the quality of the position signals generated.

Figure 4B:
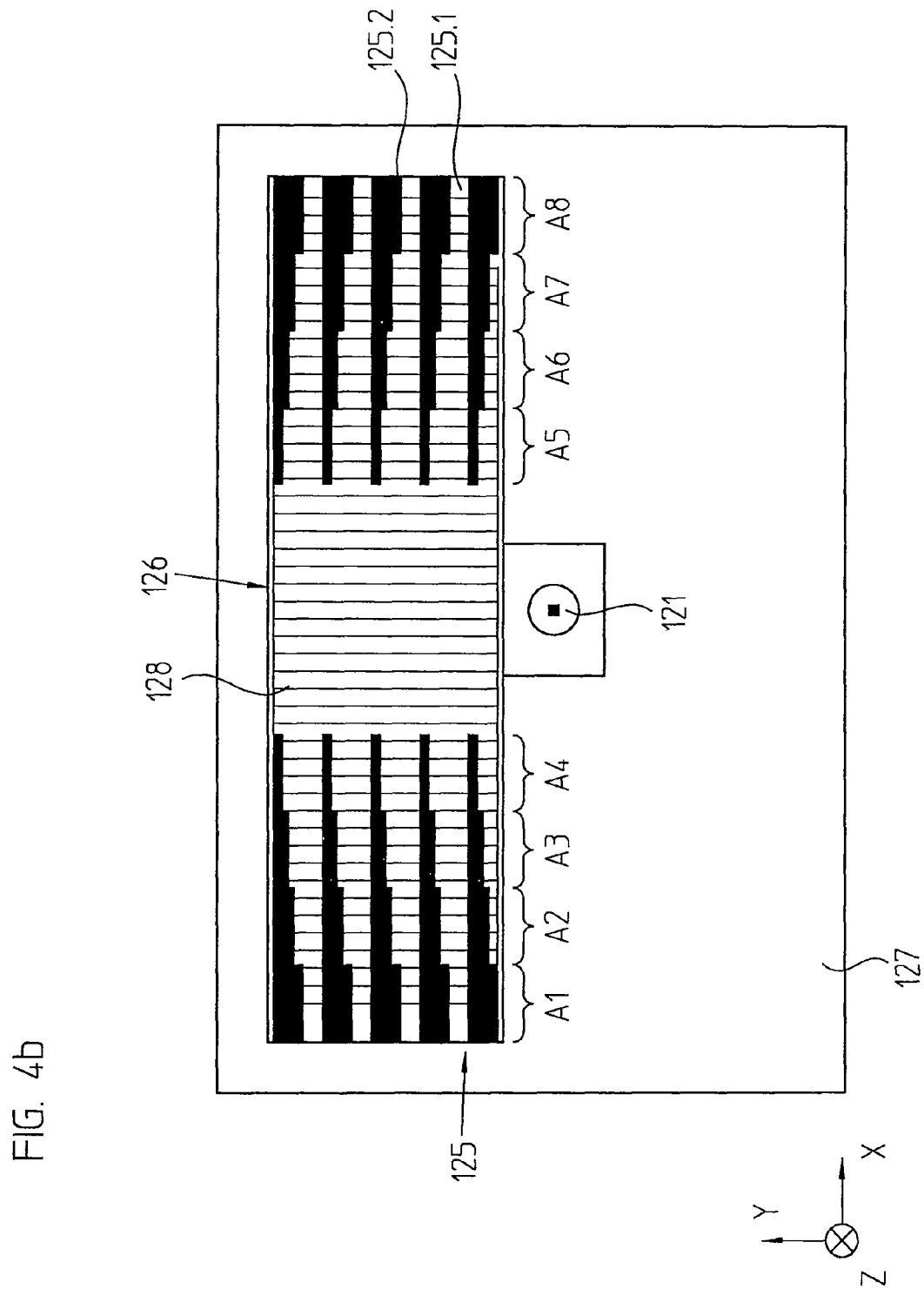
FIG. 4b shows a view of a suitable embodiment of an attenuation structure to be used with the measuring device of FIG. 3.

FIG. 4b in a plan view on the scanning unit 120 of FIG. 3 shows an exemplary embodiment of an attenuation structure 125 embodied according to the invention, which as a function of location affects or attenuates this kind of varying intensity distribution in the measurement direction x. In the final analysis, the result in the detection plane is a light pattern with a uniformly reduced intensity distribution at least in the measurement direction x. It is understood that it is also possible to provide the attenuation structure in a plurality of directions with permeabilities that vary as a function of location.

As with the embodiment of FIG. 1, an attenuation structure 125 of this kind includes a defined geometric arrangement of transparent subregions 125.1, on an otherwise opaque layer in which the opaque subregions 125.2 are then embodied. The corresponding subregions 125.1, 125.2 can in turn be embodied in linear form, that is, as gratings, or have other geometries.

In the exemplary embodiment shown in FIG. 4b, a grating-like structure is again provided as the attenuation structure 125. The structure includes a plurality of portions A1-A8 in the measurement direction x with gratings of different periodicity. In the central region of the attenuation structure 125, where as in FIG. 4a a slighter intensity of the light pattern is already present, no gratings are necessary. Toward the outside, increasing attenuation is effected by the attenuation structure 125 shown because it is ensured, by way of the different periodic gratings in the various portions A1-A8 that less and less light is let through by the transparent subregions 125.1 in the direction of the detector arrangement 126. Thus, in the outer portions A1 and A8, the width of the opaque subregions is markedly greater than in the central portions A4 and A5, for instance, and so forth.

As with the first embodiment of FIG. 1, linear transparent subregions 125.1 of the various portions A1-A8 of the attenuation structure 125 of FIG. 4b, are disposed perpendicular to the measurement graduation in this exemplary embodiment. The corresponding subregions 125.1, like the opaque subregions 125.2, extend in the x direction that is perpendicular to the y direction in which the graduation regions of the measurement graduation extend. In this way, once again, the least possible optical influence on the scanning beam path is ensured.

For designing the transmission $\tau(k)$ that varies as a function of location in this embodiment of the attenuation structure 125, the least intensity $i_0$ of the light pattern measured on the detector arrangement 126 is determined. If $i(k)$ represents the intensity of the light pattern measured at the location k, the requisite location-dependent transmission $\tau(k)$ of the attenuation structure 125 then becomes $\tau(k)=i_0/i(k)$. This is fundamentally true whenever larger regions are viewed and discretization of the location-dependent transmission $\tau(k)$ is done.

Figure 4C:
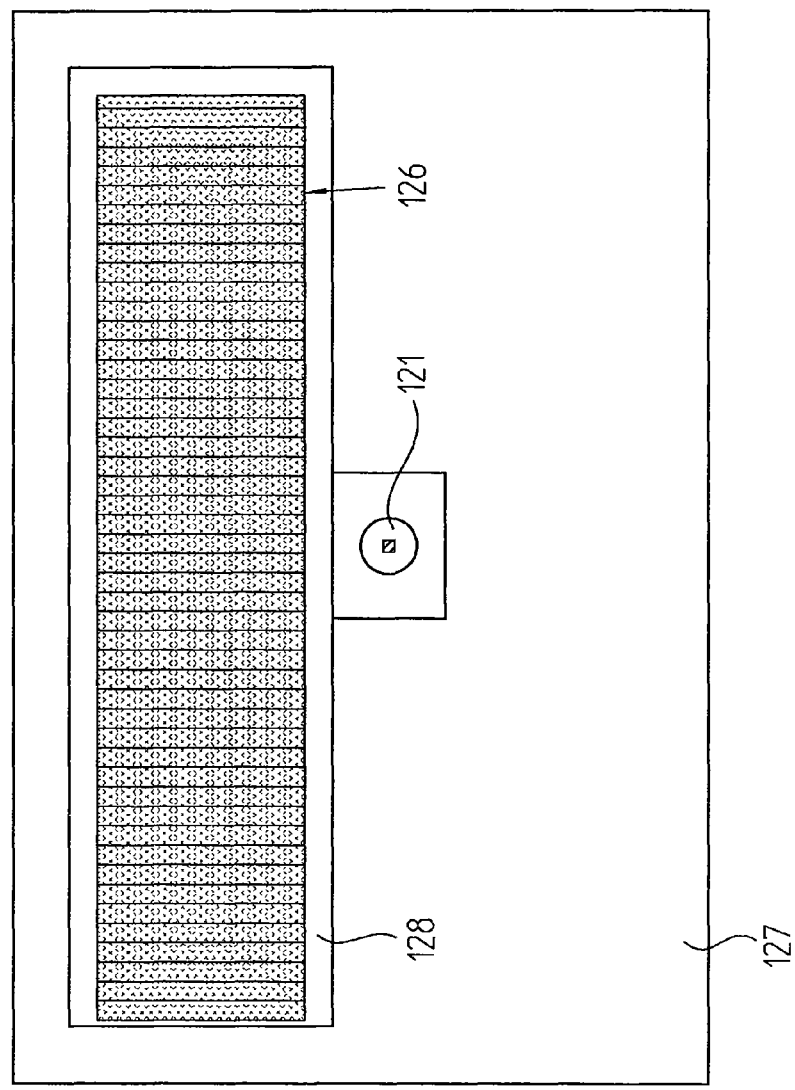
FIG. 4c shows a resultant light pattern in the detection plane of the measuring device of FIG. 3, using an attenuation structure in accordance with FIG. 4b.

Finally, the light pattern on the detector arrangement 126 that results in conjunction with the attenuation structure of FIG. 4b is shown in FIG. 4c. In the measurement direction x, a homogeneous and consistently attenuated intensity of the light pattern is now ensured.

The case of a different resultant intensity distribution on the detector arrangement of a measuring device of FIG. 3 and an attenuation structure suitable for the different intensity distribution will now be described below in conjunction with FIGS. 5a-5c.

Figure 5A:
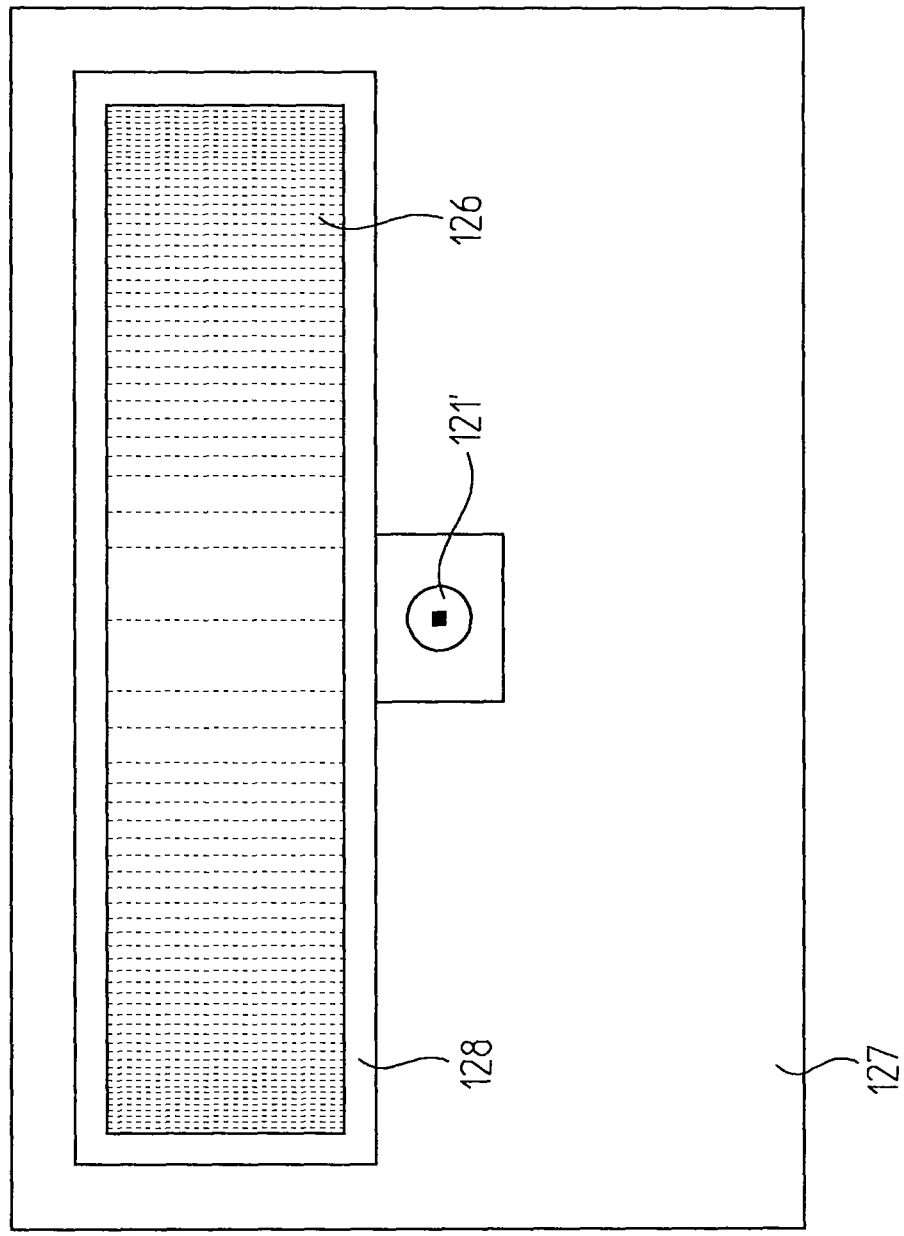

FIG. 5a, shows a plan view on the resultant light pattern and its intensity distribution in the detection plane of the detector arrangement 126 of FIG. 3 without an attenuation structure being present. Because of the use of a different light source 121' compared to the light source 121 of FIG. 4a, a marked decrease in the intensity of the light pattern from a central region to both sides outward can now be found, because of the light source emission characteristic in the measurement direction x.

In order to ensure the sought homogeneous intensity distribution on the detector arrangement 126, at least in the measurement direction x, an attenuation structure 125' is used according to the present invention as, shown in FIG. 5b. With this embodiment of an attenuation structure 125' of the present invention, greater attenuation of the light intensity must accordingly occur in the central region of the detector arrangement 126', while toward the outside an increasingly lesser attenuation is needed. As seen from FIG. 5b, once again a grating-like structure is provided as the attenuation structure 125'. In the measurement direction x, it has a plurality of portions A1'-A7' with gratings with different line to gap ratios and with a different transmission $\tau$. In the central region of the attenuation structure 125', that is in portion A4', the highest intensity of the light pattern is present in FIG. 5a, the periodic grating that has the greatest width for opaque subregions 125.2' and the least width for transparent subregions 125.1' is provided. Toward the outside, as a result of the attenuation structure 125' shown, an increasingly lesser attenuation takes place, because it is ensured via the various gratings in the various portions A1'-A3' and A5'-A7' that more light is let through in the direction of the detector arrangement 126 by the transparent subregions 125.1'.

The transparent subregions 125.1', which again are linear, of the various portions A1'-A7' of the attenuation structure 125' are each disposed perpendicular to the measurement graduation as in the foregoing exemplary embodiments of FIGS. 1-4. The corresponding subregions 125.1', like the opaque subregions 125.2', extend in the x direction that is perpendicular to the y direction in which the graduation regions of the measurement graduation extend.

Figure 5C:
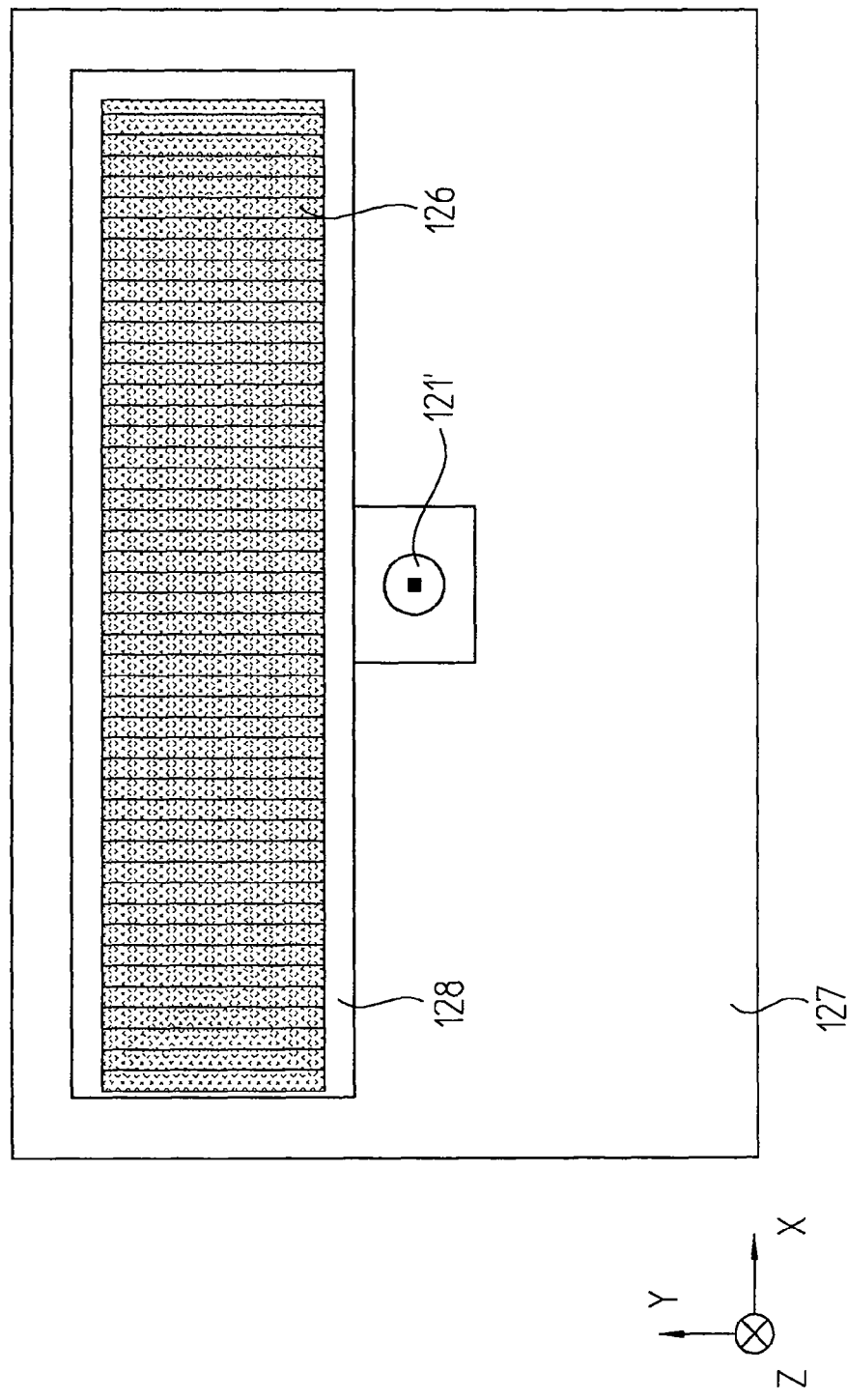
FIG. 5c shows a resultant light pattern in the detection plane of the measuring device of FIG. 3, using the attenuation structure of 5b.

The light pattern on the detector arrangement 126 that results with the aid of an attenuation structure 125' embodied in this way is shown in FIG. 5c. Once again, in the measurement direction x a homogeneous, consistently attenuated intensity of the light pattern is ensured.

A further alternative embodiment of an attenuation structure of the present invention to be used with the embodiment of FIG. 4 is shown in FIG. 6. It likewise serves to attenuate a resultant intensity pattern on the detector arrangement in the measurement direction x, as shown in FIG. 4a. Here, there is already a sufficiently slight light intensity in the central region of the detector arrangement. Only in the outer regions of the detector arrangement does this light intensity still have to be reduced by a suitable design of an attenuation structure.

The attenuation structure 225 in the example of FIG. 6 includes comprises a mirror-symmetrical arrangement of conelike, triangular opaque subregions 225.2, which taper in the direction of the central region of the detector arrangement 226. In this way, as by means of the attenuation structure of FIG. 4b, a uniform intensity distribution on the detector arrangement 226 is ensured in a manner similar to the attenuation structure of FIG. 4b. Only the geometric form of the transparent subregions 225.1 and opaque subregions 225.2 differs from the above example. By way of the attenuation structure 225 of FIG. 6, an especially uniform change in the attenuation in the measurement direction x can be ensured, without resulting in overly abrupt sudden changes.

In closing, further embodiments of attenuation structures that have a permeability that varies as a function of location, will be described in conjunction with FIGS. 7a and 7b. These attenuation structures can be used with the measuring arrangements of FIGS. 1-6 when a point source is used having a radially symmetrical emission characteristic. The attenuation structures 325, 425 shown schematically in these figures, unlike the examples described thus far, have a radially symmetrical embodiment. Accordingly, a targeted attenuation of an intensity distribution is effected not merely in one direction, such as the measurement direction; instead, attenuation takes place in the radial direction over 360° about a center. Attenuation structures embodied in this way are especially advantageous whenever the intensity distribution is to be made homogeneous is also radially symmetrical. This is the case for instance with point light sources, which as a rule have this kind of radially symmetrical emission characteristic.

The attenuation structures 325, 425 with radial symmetry, shown in FIGS. 7a and 7b, are again fundamentally based on gratings that are geometrically designed and disposed in a certain way.

Figure 7A:
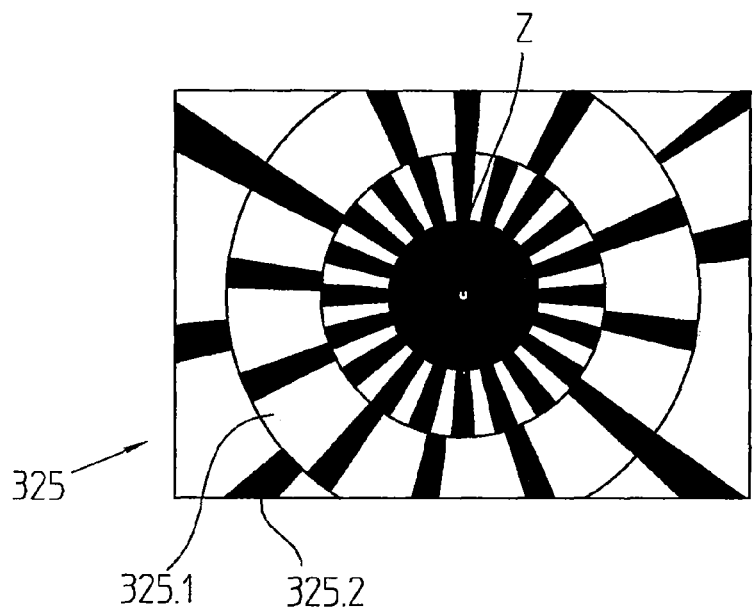
FIGS. 7a and 7b, each, one further view of an embodiment of a suitable radially embodied attenuation structure.

The exemplary embodiment of an attenuation structure 325 shown in FIG. 7a has radially symmetrically disposed linear transparent subregions 325.1, which are disposed in alternation in the circumferential direction with the opaque subregions 325.2. The attenuation structure 325 is subdivided into a plurality of concentrically disposed portions, within which the periodicities of the respective periodically disposed transparent and opaque subregions 325.1, 325.2 differ. The permeability in the concentric portions increases toward the outside; in the region of the center Z, because of the completely opaque subregion provided there, complete attenuation takes place.

Figure 7B:
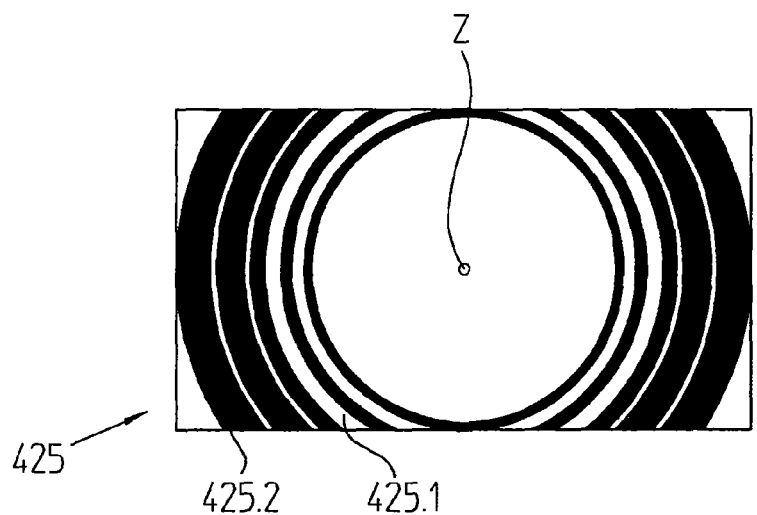

In the exemplary embodiment of an attenuation structure 425 with radial symmetry shown in FIG. 7b, the opaque subregions 425.2 and the transparent subregions 425.1 are each embodied as concentric rings around the center Z. Toward the outside, the width of the circularly arranged opaque subregions 425.2 increases, while conversely the width of the circularly arranged transparent subregions 425.1 decreases; the widths of the various subregions 425.1, 425.2 thus vary in the radial direction. The result is increasing attenuation of the light intensity outward, while in a central, inner subregion of the detector arrangement 426 no attenuation whatever takes place.

As in the examples described above, in the radially symmetrical variants of an attenuation structure, the various transparent subregions are embodied in an otherwise opaque layer.

Within the scope of the present invention, manifold possibilities thus exist for embodying suitable attenuation structures in the scanning beam path of optical measuring devices. It is understood that the possibilities described in conjunction with the description can be combined suitably as needed and adapted to the particular situation accordingly.

Further embodiment variations of the method and devices in accordance with the present invention of course exist besides the explained examples and embodiments.

I claim:

1. A measuring device for detecting a relative position, the measuring device comprising:
    a measurement graduation;
    a scanning unit, being movable in at least one measurement direction with respect to said measurement graduation, said scanning unit comprising:
        a light source;
        a scanning grating disposed on a first side of a transparent carrier element that is positioned in a scanning beam path;
        a detector arrangement; and
        an attenuation structure that adjusts a light intensity on said detector arrangement in a defined manner, wherein said attenuation structure is disposed on a second side, opposite said first side, of said transparent carrier element.

2. The measuring device as defined by claim 1, wherein said attenuation structure comprises an arrangement of transparent subregions on an opaque layer.

3. The measuring device as defined by claim 2, wherein said transparent subregions are embodied in circular form.

4. The measuring device as defined by claim 2, wherein said attenuation structure comprises a grating in which said transparent subregions are disposed periodically on said opaque layer.

5. The measuring device as defined by claim 4, wherein said transparent subregions are embodied in linear form and are oriented perpendicular to said measurement graduation in said scanning beam path.

6. The measuring device as defined by claim 4, wherein said grating comprises one or more periodicities, which are each markedly less than a extension of said detector arrangement in a direction perpendicular to said measurement direction.

7. The measuring device as defined by claim 2, wherein said attenuation structure comprises a grating in which said transparent subregions are disposed radially symmetrically on said opaque carrier element.

8. The measuring device as defined by claim 7, wherein a width of said transparent subregions in a radial direction varies.

9. The measuring device as defined by claim 7, wherein said attenuation structure comprises concentrically arranged portions, inside which said transparent subregions are disposed radially symmetrically and periodically, and periodicities of adjacent ones of said concentrically arranged portions differ.

10. The measuring device as defined by claim 2, wherein said attenuation structure comprises a plurality of portions disposed adjacent one another in said measurement direction, wherein each of said plurality of portions includes a grating disposed periodically in a direction perpendicular to said measurement direction, with linear transparent subregions, which are disposed periodically on said opaque layer on said carrier element, and adjacent ones of said plurality of portions in said measurement direction have a different periodicity with respect to each other.

11. The measuring device as defined by claim 1, wherein said light source, said scanning grating, said detector arrangement and said attenuation structure are disposed in such a way that
    a beam emitted by said light source initially experiences a collimation via a collimator lens;
    said collimated beam thereupon strikes said measurement graduation;

said collimated beam travels through said scanning grating, said carrier element, and said attenuation structure; and finally impinge on said detector arrangement, at which signals modulated as a function of displacement are then present for further processing.

12. The measuring device as defined by claim 1, wherein said attenuation structure comprises a regular arrangement of transparent subregions on an opaque carrier element.

13. A measuring device for detecting a relative position, the measuring device comprising:
- a measurement graduation;
- a scanning unit, being movable in at least one measurement direction with respect to said measurement graduation, said scanning unit comprising:
  - a light source;
  - a detector arrangement; and
  - an attenuation structure that adjusts a light intensity on said detector arrangement in a defined manner, wherein said attenuation structure has a permeability that varies as a function of location at least along one direction so that a light intensity which is uniform at least in that one direction results on said detector arrangement.

14. The measuring device as defined by claim 13, wherein said attenuation structure comprises an arrangement of transparent subregions on an opaque layer.

15. The measuring device as defined by claim 14, wherein said transparent subregions are embodied in circular form.

16. The measuring device as defined by claim 14, wherein said attenuation structure comprises a grating in which said transparent subregions are disposed periodically on said opaque layer.

17. The measuring device as defined by claim 16, wherein said transparent subregions are embodied in linear form and are oriented perpendicular to said measurement graduation in said scanning beam path.

18. The measuring device as defined by claim 16, wherein said grating comprises one or more periodicities, which are each markedly less than a extension of said detector arrangement in a direction perpendicular to said measurement direction.

19. The measuring device as defined by claim 14, wherein said attenuation structure comprises a grating in which said transparent subregions are disposed radially symmetrically on said opaque carrier element.

20. The measuring device as defined by claim 19, wherein a width of said transparent subregions in a radial direction varies.

21. The measuring device as defined by claim 19, wherein said attenuation structure comprises concentrically arranged portions, inside which said transparent subregions are disposed radially symmetrically and periodically, and periodicities of adjacent ones of said concentrically arranged portions differ.

22. The measuring device as defined by claim 14, wherein said attenuation structure comprises a plurality of portions disposed adjacent one another in said measurement direction, wherein each of said plurality of portions includes a grating disposed periodically in a direction perpendicular to said measurement direction, with linear transparent subregions, which are disposed periodically on said opaque layer on said carrier element, and adjacent ones of said plurality of portions in said measurement direction have a different periodicity with respect to each other.

23. The measuring device as defined by claim 13, wherein beams emitted by said light source propagate in a direction toward said measurement graduation, thereupon said beams act on said measurement graduation and then travel through said attenuation structure, and because of interaction between said beams and said measurement graduation, a displacement-dependently modulated fringe pattern on said detector arrangement results, and said detector arrangement comprises a periodic arrangement of a plurality of detector elements.

24. The measuring device as defined by claim 13, wherein said attenuation structure is disposed on one side of a transparent carrier element in a scanning beam path.

\* \* \* \* \*